US009970205B2

(12) United States Patent
Mora

(10) Patent No.: US 9,970,205 B2
(45) Date of Patent: May 15, 2018

(54) CARPET REMOVAL TOOL

(71) Applicant: Roberto Mora, Rolette, ND (US)

(72) Inventor: Roberto Mora, Rolette, ND (US)

(*) Notice: Subject to any disclaimer, the term of this patent is extended or adjusted under 35 U.S.C. 154(b) by 0 days. days.

(21) Appl. No.: 15/488,970

(22) Filed: Apr. 17, 2017

(65) Prior Publication Data
US 2017/0298642 A1  Oct. 19, 2017

Related U.S. Application Data

(60) Provisional application No. 62/322,951, filed on Apr. 15, 2016.

(51) Int. Cl.
*B32B 38/10* (2006.01)
*E04G 23/00* (2006.01)
*B32B 43/00* (2006.01)

(52) U.S. Cl.
CPC .......... *E04G 23/006* (2013.01); *B32B 43/006* (2013.01); *B32B 38/10* (2013.01); *B32B 2471/02* (2013.01); *Y10T 156/1168* (2015.01)

(58) Field of Classification Search
CPC .. B32B 38/10; B32B 43/006; Y10T 156/1168
USPC ....................................... 156/714
See application file for complete search history.

(56) References Cited

U.S. PATENT DOCUMENTS

| 1,186,729 | A | * | 6/1916 | Baker | G11B 15/42 |
| | | | | | 242/546.1 |
| 2,655,976 | A | * | 10/1953 | Lovin | E04G 23/006 |
| | | | | | 156/714 |
| 3,982,767 | A | * | 9/1976 | Larsson | B62B 3/06 |
| | | | | | 254/2 C |
| 4,332,371 | A | | 6/1982 | Bell et al. | |
| 4,533,118 | A | * | 8/1985 | Thomas | A47G 27/0487 |
| | | | | | 156/763 |
| 4,640,735 | A | * | 2/1987 | Murray | E04D 15/003 |
| | | | | | 156/714 |
| 4,906,323 | A | * | 3/1990 | Thomas | A47G 27/0487 |
| | | | | | 156/717 |
| 5,387,308 | A | * | 2/1995 | Heavrin | A47G 27/0487 |
| | | | | | 156/759 |
| 5,456,794 | A | * | 10/1995 | Barrett | A47G 27/0487 |
| | | | | | 156/714 |
| 5,891,297 | A | * | 4/1999 | Stadtmueller | B29C 63/0013 |
| | | | | | 156/715 |
| 5,902,015 | A | * | 5/1999 | Allcock | B25B 7/02 |
| | | | | | 297/250.1 |
| 5,909,868 | A | | 6/1999 | Galella | |

(Continued)

*Primary Examiner* — Mark A Osele
*Assistant Examiner* — Nickolas Harm
(74) *Attorney, Agent, or Firm* — Global Intellectual Property Agency, LLC; Jordan Sworen

(57) ABSTRACT

A tool for removing carpet from a floor. The carpet removal tool includes a panel having an elongated opening thereon. Opposing ends of the panel include handles pivotally affixed thereto to be grasped by one or more users, wherein the handles can be positioned parallel to or perpendicular to the panel. In operation, the user cuts a portion of the carpet to be removed and secures the end of the carpet within the elongated opening on the panel. The user then pulls using the handle so that the carpet wraps around the panel as it is removed from the floor. The carpet can be manually wrapped around the panel by the user.

11 Claims, 4 Drawing Sheets

(56) References Cited

U.S. PATENT DOCUMENTS

| | | | | |
|---|---|---|---|---|
| 6,004,426 | A * | 12/1999 | Johnson | ................ E04G 23/006 |
| | | | | 156/715 |
| 6,131,972 | A * | 10/2000 | Whitehead | ............. B25G 1/102 |
| | | | | 16/430 |
| 6,227,479 | B1 * | 5/2001 | Dean | ..................... B65H 18/10 |
| | | | | 156/717 |
| 6,386,476 | B1 * | 5/2002 | Adleman, Jr. | ........ E04G 23/006 |
| | | | | 156/763 |
| 6,613,188 | B1 * | 9/2003 | Berg | .................... E04G 23/006 |
| | | | | 156/715 |
| 7,125,326 | B2 * | 10/2006 | Walsh | ..................... B24B 37/34 |
| | | | | 451/442 |
| 7,222,403 | B2 * | 5/2007 | Tehrani | ................. B24B 37/042 |
| | | | | 29/239 |
| 7,655,109 | B2 | 2/2010 | Manners | |
| 7,850,249 | B2 | 12/2010 | Manners | |
| 8,118,076 | B1 * | 2/2012 | Galbraith | ............. E04G 23/006 |
| | | | | 156/714 |
| 8,142,610 | B2 * | 3/2012 | Tani | ........................ B08B 7/00 |
| | | | | 156/715 |
| 8,715,460 | B2 * | 5/2014 | Bandy | ................ B29C 63/0013 |
| | | | | 156/714 |
| 8,782,854 | B1 * | 7/2014 | Samuels | ................ B25G 1/102 |
| | | | | 16/428 |
| 2004/0026045 | A1 | 2/2004 | Adleman | |
| 2008/0236743 | A1 * | 10/2008 | Kye | ................... B29C 63/0013 |
| | | | | 156/714 |
| 2012/0234498 | A1 * | 9/2012 | Vidovic, Jr. | .......... E04G 23/006 |
| | | | | 156/714 |

* cited by examiner

US 9,970,205 B2

CARPET REMOVAL TOOL

CROSS REFERENCE TO RELATED APPLICATION

This application claims the benefit of U.S. Provisional Application No. 62/322,951 filed on Apr. 16, 2016. The above identified patent application is herein incorporated by reference in its entirety to provide continuity of disclosure.

BACKGROUND OF THE INVENTION

The present invention relates to carpet removal tools. More specifically, the present invention provides a panel having an elongated opening thereon. Opposing ends of the panel include handles pivotally affixed thereto to be grasped by one or more users, wherein the handles can be positioned parallel to or perpendicular to the panel.

Removing carpet from a floor requires force to overcome the fastening material used to bond the carpet to a floor. However, conventional, easy to use carpet removal tools do not provide the user with adequate leverage for removing the carpet and may cause the carpet to tear or to be removed unevenly. As a result, many people may hire a professional to remove the carpet due to the difficulty of doing so themselves. Thus, an improved carpet removal tool is desired for allowing a person to more easily remove a carpet by exerting less force.

In light of the devices disclosed in the known art, it is submitted that the present invention substantially diverges in design elements from the prior art and consequently it is clear that there is a need in the art for an improvement to existing carpet removal tools. In this regard the instant invention substantially fulfills these needs.

SUMMARY OF THE INVENTION

In view of the foregoing disadvantages inherent in the known types of carpet removal tools now present in the prior art, the present invention provides a new carpet removal tool wherein the same can be utilized for providing convenience for the user when removing carpet from a floor.

It is therefore an object of the present invention to provide a new and improved carpet removal tool that has all of the advantages of the prior art and none of the disadvantages. The carpet removal tool comprises a panel having an elongated opening thereon. Opposing ends of the panel include handles pivotally affixed thereto to be grasped by one or more users, wherein the handles can be positioned parallel to or perpendicular to the panel. In operation, the user cuts a portion of the carpet to be removed and secures the end of the carpet within the elongated opening on the panel. The user then pulls using the handle so that the carpet wraps around the panel as it is removed from the floor.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
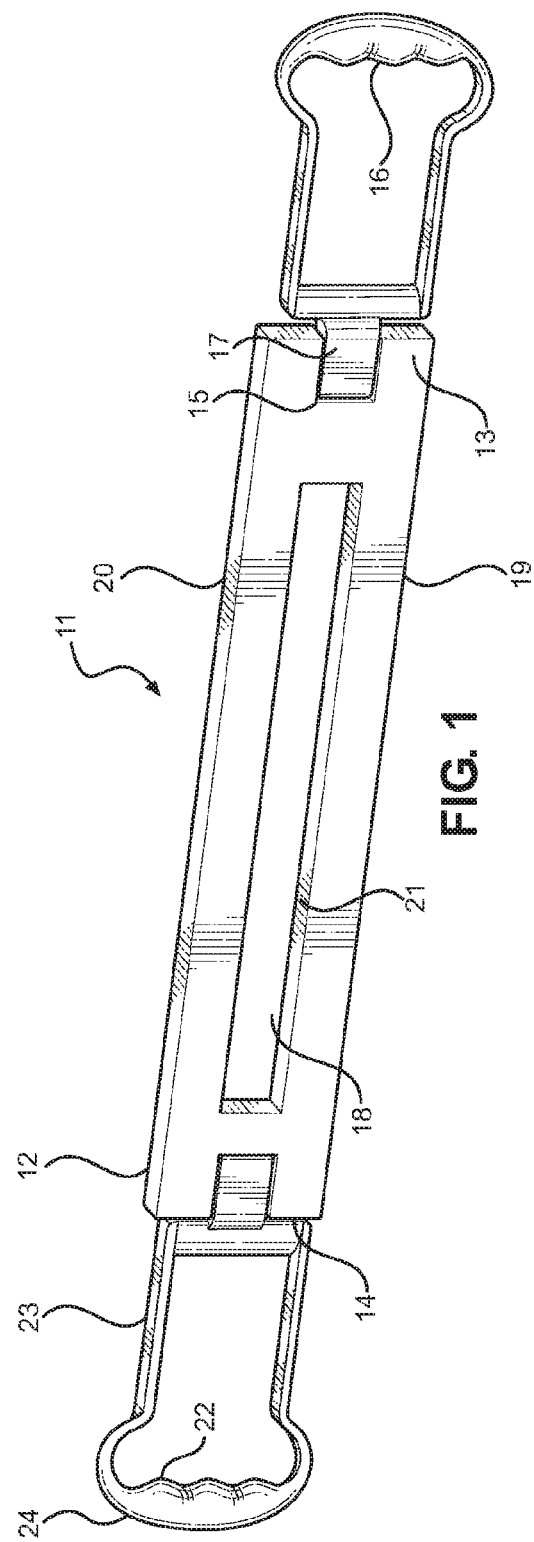
FIG. 1 shows a perspective view of the carpet removal tool.

Reference is made herein to the attached drawings. Like reference numerals are used throughout the drawings to depict like or similar elements of the carpet removal tool. For the purposes of presenting a brief and clear description of the present invention, the preferred embodiment will be discussed as used for removing carpet from a floor. The figures are intended for representative purposes only and should not be considered to be limiting in any respect.

Figure 2:
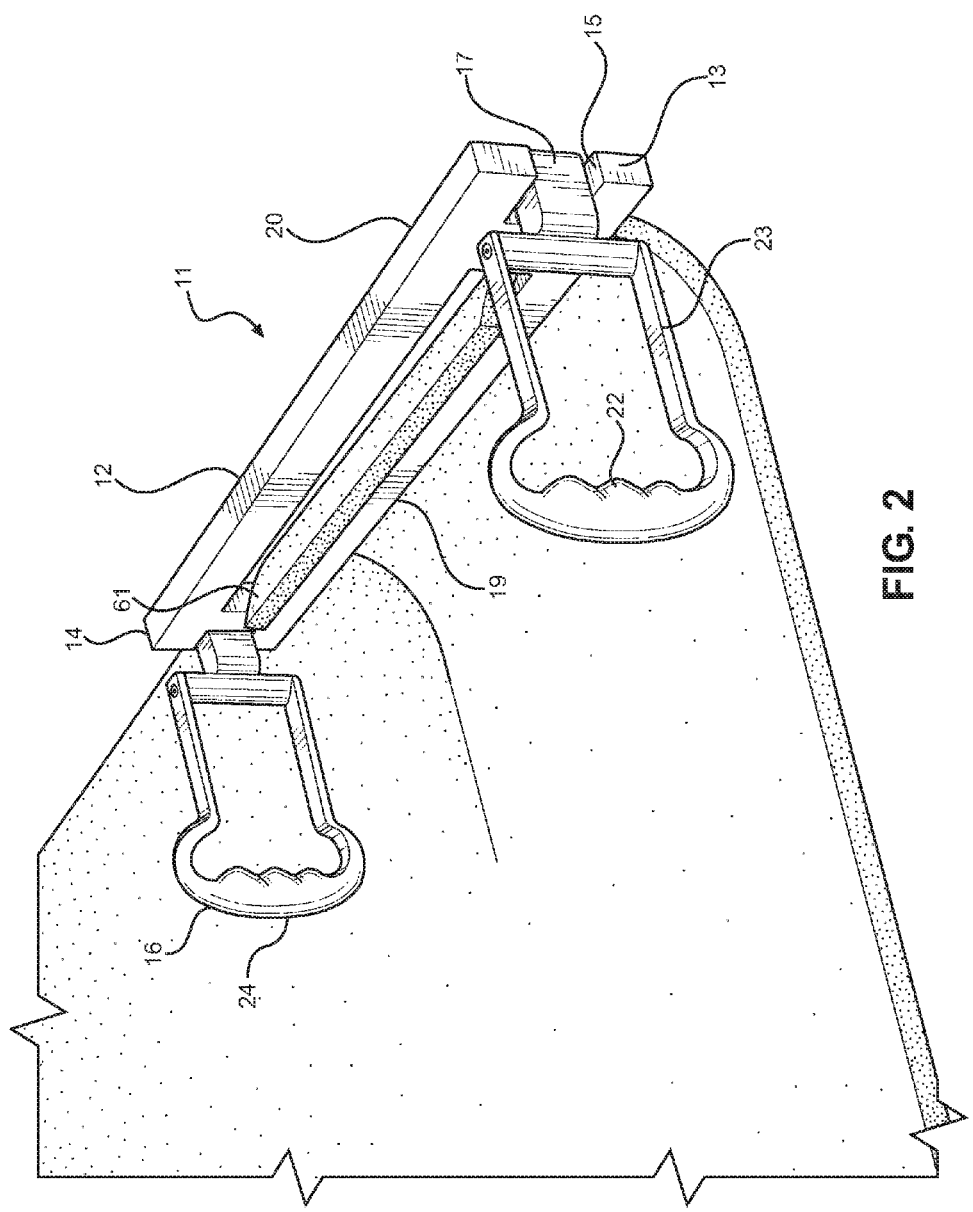
FIG. 2 shows a perspective view of the carpet removal tool wherein a section of carpet is positioned through the elongated opening.

Referring now to FIGS. 1 and 2, there is shown a perspective view of the carpet removal tool and a perspective view of the carpet removal tool wherein a section of carpet is positioned through the elongated opening, respectively. The carpet removal tool 11 comprises a panel 12 having a first end 13, a second end 14, a lower end 19 and an upper end 20. In the illustrated embodiment, the panel 12 comprises a rectangular shape. However, in alternate embodiments, the panel 12 comprises any suitable shape, such as an oval or square. The panel 12 is composed of any suitable, durable, rigid material, such as metal.

The panel 12 comprises an elongated opening 18 configured to receive a section of carpet 61 therethrough, as shown in FIG. 2. In the illustrated embodiment, the elongated opening 18 is centrally positioned between the first and second ends 13, 14 and the lower and upper ends 19, 20 of the panel 12. The elongated opening 18 comprises a rectangular shaped cross section in order to receive the section of carpet 61 having a similar shaped cross section therethrough. In the illustrated embodiment, the elongated opening 18 comprises a width of approximately one-third of the width of the panel 12, wherein the width is measured from the lower end 19 to the upper end 20 of the panel 12. In alternate embodiments, the elongated opening 18 comprises any suitable width configured to receive carpet therethrough. In the illustrated embodiment, the elongated opening 18 comprises a length extending at least three-fourths of the length of the panel 12, wherein the panel 12 is measured from the first end 13 to the second end 14.

Figure 3:
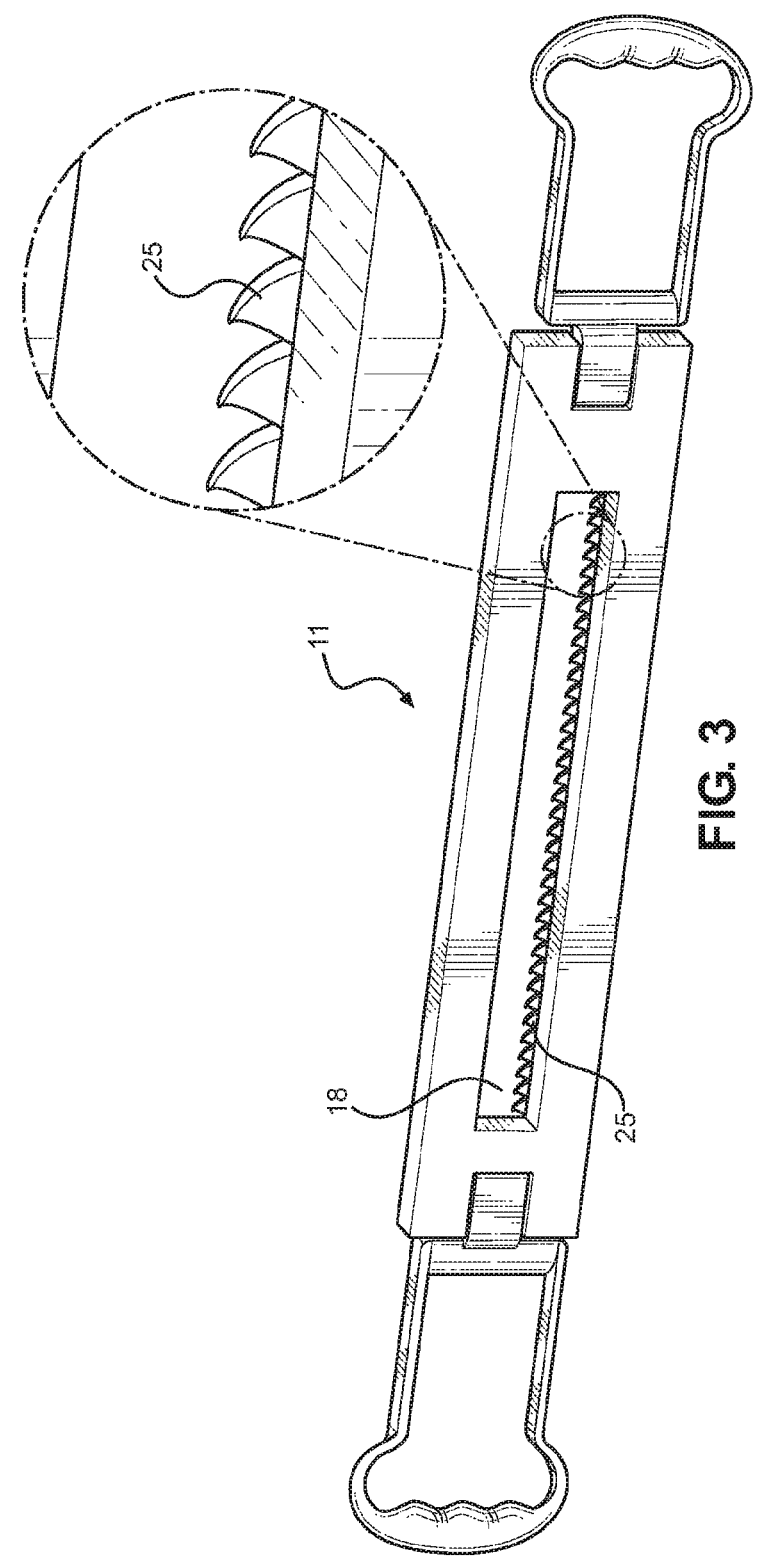
FIG. 3 shows a perspective view and a call out view of an alternate embodiment of the carpet removal tool.
Figure 4:
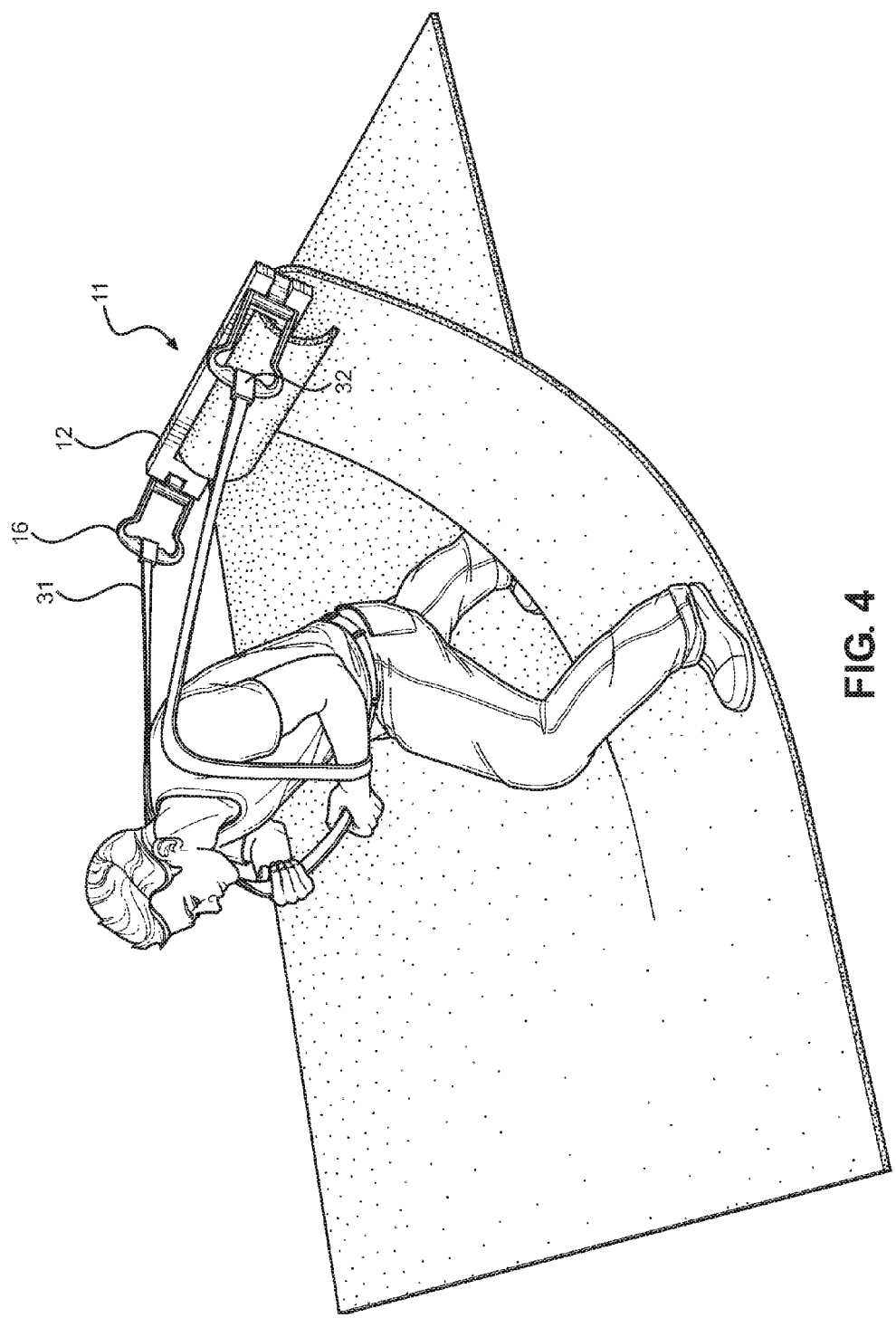
FIG. 4 shows a perspective view of the carpet removal tool in use.

Referring now to FIG. 3, there is shown a perspective view and a call out view of an alternate embodiment of the carpet removal tool. In some embodiments, a lower end 21 of the elongated opening 18 comprises a serrated edge 25 having a plurality of teeth in order to secure a bottom side of the section of carpet once the section of carpet is positioned therethrough. In the illustrated embodiment, the serrated edge 25 extends the entire length of the opening 18. The serrated edge 25 is disposed along a single exterior edge of the elongated opening 18, wherein the upper end of the serrated edge 25 is angled toward the opposing exterior edge of the opening or towards the interior of the elongated opening 18. In the illustrated embodiment, each serration of the serrated edge 25 comprises a curve in order to form the angle. In this way, the section of carpet is easily moved over the serrated edge 25 and through the opening 18. The teeth of the serrated edge 25 are shown as having a point at the apex thereof. However, in alternate embodiments the apex of the teeth are rounded so as to provide a dull, non-pointed surface. The apex of the serrations are configured to prevent the carpet from being easily removed from the opening once initially positioned therethrough.

The first and second ends 13, 14 of the panel 12 include handles 16 pivotally affixed thereto to be grasped by one or more users. The first and second ends 13, 14 of the panel 12 each include a slot 15 having a proximal end 17 of the handle 16 positioned therein. The proximal ends 17 of the handles 16 fit within a close tolerance of the slots 15, wherein the proximal ends 17 are capable of pivoting therein. In the illustrated embodiment, the slot 15 and proximal end 17 of the handle 16 comprise a rectangular shape.

An opposing distal end 24 of the handle 16 comprises a bulbous shape that is larger in width than a middle section 23, wherein the middle section 23 is disposed between the proximal and distal ends 17, 24 of the handle 16. The distal end 24 comprises a plurality of knuckles 22 in order to receive a user's grasp thereon. The knuckles 22 are positioned along the interior of the handle 16. The distal end 24 and middle section 23 of the handle 16 comprise an open center in order to receive one or more hands therethrough. The open structure of the handle 16 allows a user to place two hands through a single handle 16. In the illustrated embodiment, the width of the handle 16 is more than three-fourths the width of the panel 12. In the illustrated embodiment, the handle 16 comprises a thickness that is less than or equal to the thickness of the panel 12.

The handles 16 can each be positioned between a first position and a second position. In the first position, the handles 16 are parallel to the panel 12 and in the second position the handles 16 are perpendicular to the panel 12. In some embodiments, the handles 16 comprise a detent hinge in order to secure each handle 16 in a desired position. The detent hinge allows the handle 16 to remain in a position anywhere between and including the first and second position. In other embodiments, the handles 16 are spring biased towards the second position in order to evenly distribute force applied to each handle 16.

Referring now to FIG. 3, there is shown a perspective view of the carpet removal tool in use. In the illustrated embodiment, the carpet removal tool 11 comprises a strap 31 configured to removably secure directly to the handles 16. The strap 31 comprises a pair of ends each having a fastener 32 thereon, such as a clip, wherein the fastener 32 attaches to handle 16. The strap 31, the handles 16, and the panel 12 form a closed loop when the strap 31 is attached thereto. The user can then position the strap 31 around his or her upper body and can walk and use his or her leg strength to provide the force required to remove the carpet from the floor. Upon the carpet being removed, the user may spin the carpet removal tool 11 back one rotation and pull the carpet removal tool 11 from the carpet.

In operation, the user cuts a portion of the carpet to be removed and secures the end of the carpet within the elongated opening on the panel. The user then pivots the pair of handles towards one another and pulls using the handle so that the carpet wraps around the panel as it is removed from the floor. Alternatively, a first user can hold one handle and a second user can hold the second handle. The users can then pull in order to remove the carpet from the floor. The carpet can be wrapped manually around the panel by the user.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A carpet removal tool, comprising:
a panel having a first end opposite a second end;
an elongated opening extending between the first end and the second end, wherein the opening is configured to receive a section of carpet therethrough;
a pair of handles each pivotally secured to the first end and the second end, wherein each of the pair of handles are configured to move from a first position to a second position;
wherein each of the pair handles comprise a detent hinge for locking the pair of handles in a desired position.

2. The carpet removal tool of claim 1, wherein the pair of handles are rotatable around the longitudinal axis of the panel.

3. The carpet removal tool of claim 1, further comprising a strap having a pair of ends removably securable to each of the pair of handles.

4. The carpet removal tool of claim 1, wherein the first position the pair of handles are linearly aligned with the panel and in the second position the pair of handles are perpendicular to the panel.

5. The carpet removal tool of claim 1, wherein each of the pair of handles comprise a proximal end, a middle section, and a distal end, wherein the distal end comprises a larger width than the width of the middle section and proximal end.

6. The carpet removal tool of claim 5, wherein the distal end comprises a plurality of knuckles on an interior thereof.

7. The carpet removal tool of claim 1, wherein the pair of handles comprises a width of at least three-fourths the width of the panel.

8. The carpet removal tool of claim 1, wherein the elongated opening comprises a width of one-third the width of the panel.

9. The carpet removal tool of claim 1, wherein a lower end of the elongated opening comprises a serrated edge.

10. The carpet removal tool of claim 1, wherein the pair of handles are spring-biased towards the second position.

11. A method for removing carpet comprising the steps of:
cutting a section of carpet;
inserting the section of carpet into an elongated opening extending between a first end opposite a second end of a panel;
pivoting a pair of handles towards one another, wherein one of the handles is pivotally secured to the first end, and the other handle is pivotally secured to the second end;
rotating the panel in a first direction in order to secure the section of carpet within the elongated opening;
moving the panel using the pair of handles such that the section of carpet is lifted away from a floor;

rotating the panel in a second direction that is opposite the first direction in order to release the section of carpet from the elongated opening.

* * * * *